No Printed Specification Available
1862X
W. HOWE.
Nurse Lamp.
Patented Dec. 31, 1812.
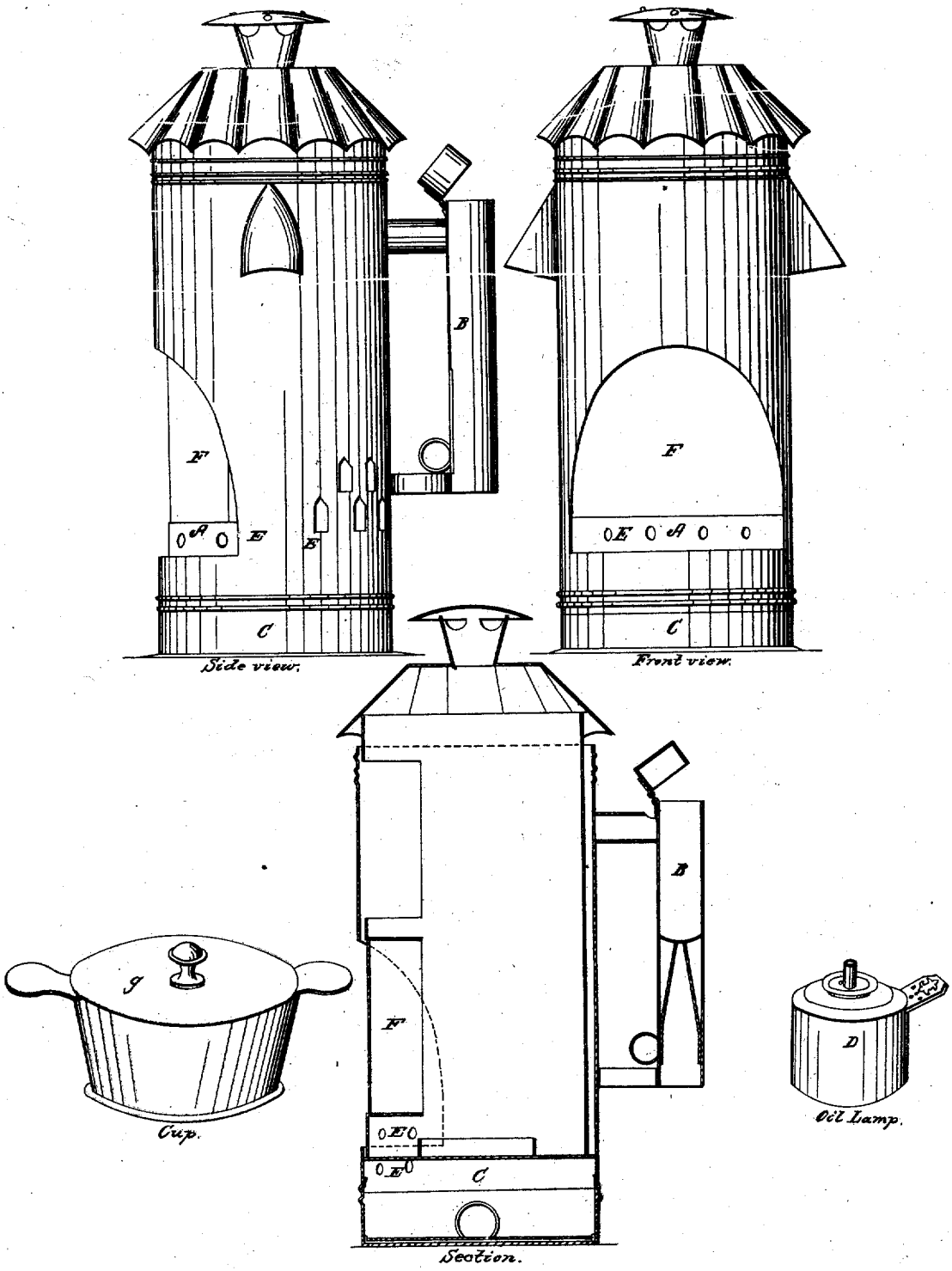
N. PETERS. Photo-Lithographer, Washington, D. C.

William Howe. 1862X

Letters Patent.

The Schedule referred to in these Letters Patent and
making part of the same, containing a description in the words of
the said William Howe, himself of his improved Nurse Lamp.

The invention of this improvement in Lamps called the
"Improved Nurse Lamp" consists in constructing the Nurse lamp
with an eclipser or shadow so as to obscure the light entirely as
occasion may require and with a tinder box at the bottom and
the handle of the lamp so made as to have the upper part of it to
serve as a temporary candlestick as a convenience which is often
wanted; and also containing the requisite construction for the purpose
of warming drinks or food in the liquid state during the night.
This lamp is made of sheet tin in shape like a common tin lantern
and rather smaller in size or larger as may be wanted. The tinder
box is fitted on the bottom of this lamp, which serves as the lid [illegible]
The eclipser is a cylinder put in the inside of the lamp having half
of its tube cut out, so that when the open place is turned to the open
place at the bottom of the lamp the light then will shine into the room,
and when the said eclipser is turned round it then obscures the light.
To the top of this eclipser is attached the top of the lamp made somewhat
like the top of a lantern and by which the eclipser is turned round or taken
out. To the bottom of said eclipser is fixed a circle on which it turns.
The lamp for the oil and light is a small vessel placed inside of said
eclipser, having a circle of tin put in the bottom of the body of the
Lamp, or lantern part to keep it steady and in its place. Proper
ventilators are made in the sides & top of the lamp and shaded
with blinds in such a manner as to prevent the light from shining
into the room when the light is eclipsed. The open place cut out of the eclipser
and through which the light is admitted into the room, may be secured
from

1862X from the air, by putting in a piece of talc, commonly called isinglass
The upper vessels in which drinks are to be warmed, are fitted into
the top of the lamp. and when used, the said eclipser is taken out and
the said cup put in and the heat from the lamp under it will warm
it as it may be wanted. The handle of the lamp has a perpendicu-
lar tube with a lid on its top. This tube may be used as a temporary
candlestick for which it is designed. At the backside where the said
handle is placed, several holes are cut through the tin for the pur-
pose of letting in air to supply the fire of the lamp. These holes
do not extend up higher than the circle on the bottom of the eclipser
which said circle prevents the light from shining through
said air holes. It is best to Japan the lamp, & when said
eclipser is finished with ising glass as before mentioned said
lamp may be used as a lantern as then the light will be secured from
the wind and be rendered safe.

Exd. Witnesses Wm Howe
W.C. John Fairbanks
Joseph G. Davis (630 Words)

Patented 31 Dec 1812